(No Model.) 3 Sheets—Sheet 1.
A. BROWNLEE.
GARBAGE FURNACE.
No. 537,339. Patented Apr. 9, 1895.
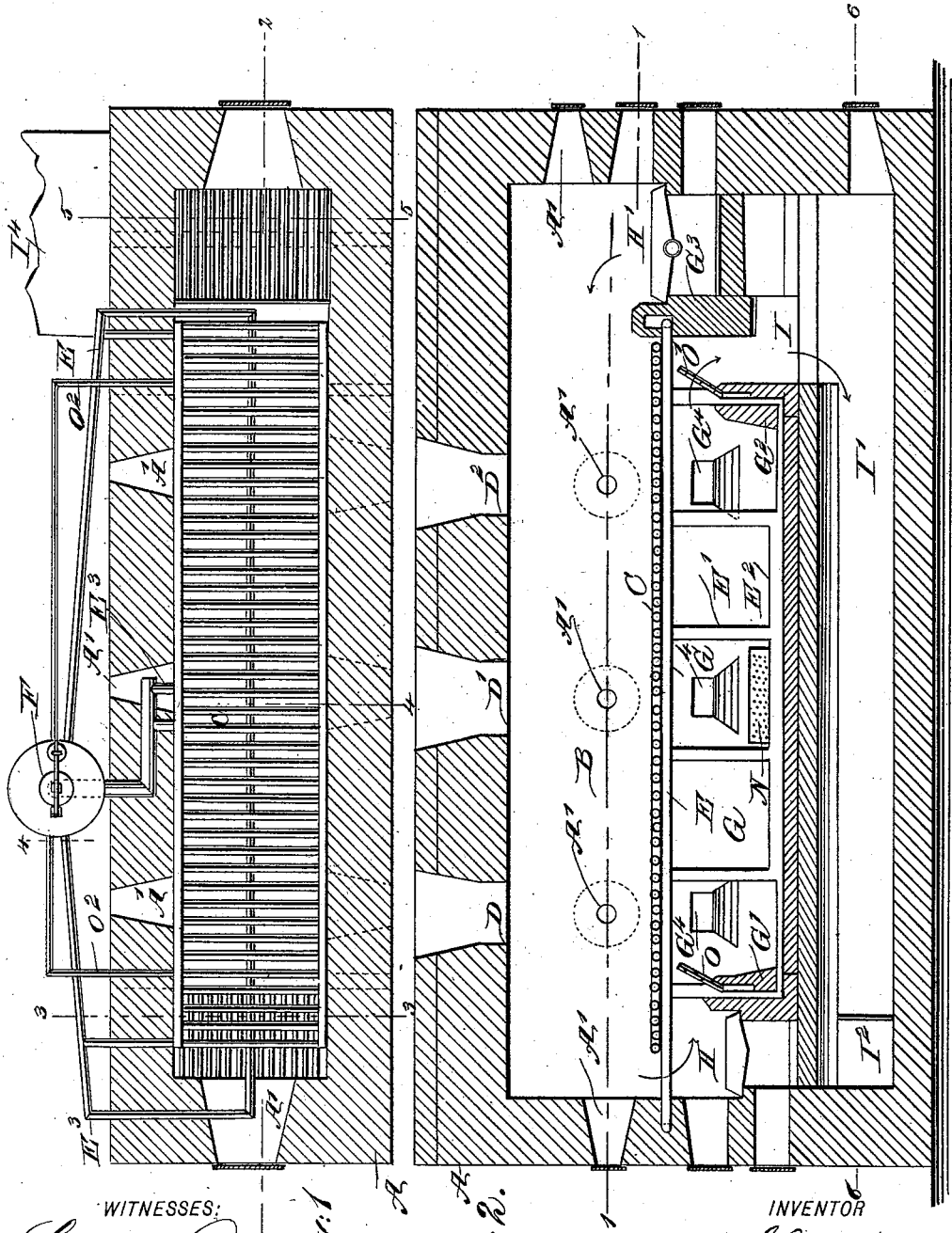
WITNESSES:
Chas. Nida.
C. Sedgwick
INVENTOR
A. Brownlee
BY
Munn & Co
ATTORNEYS.

(No Model.) 3 Sheets—Sheet 2.
A. BROWNLEE.
GARBAGE FURNACE.
No. 537,339. Patented Apr. 9, 1895.
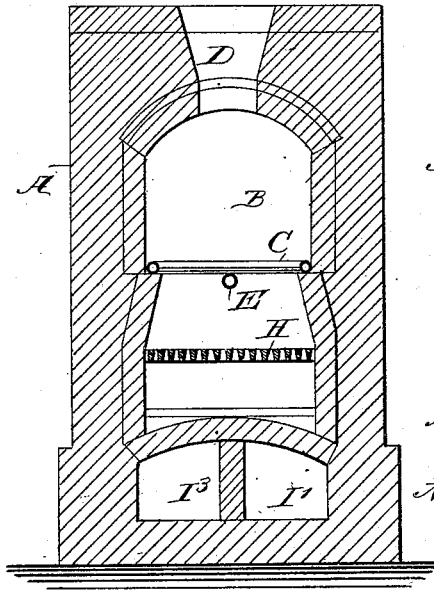
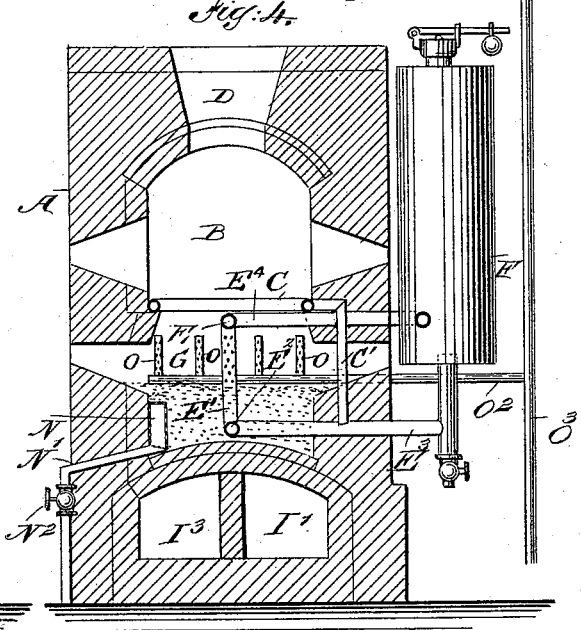
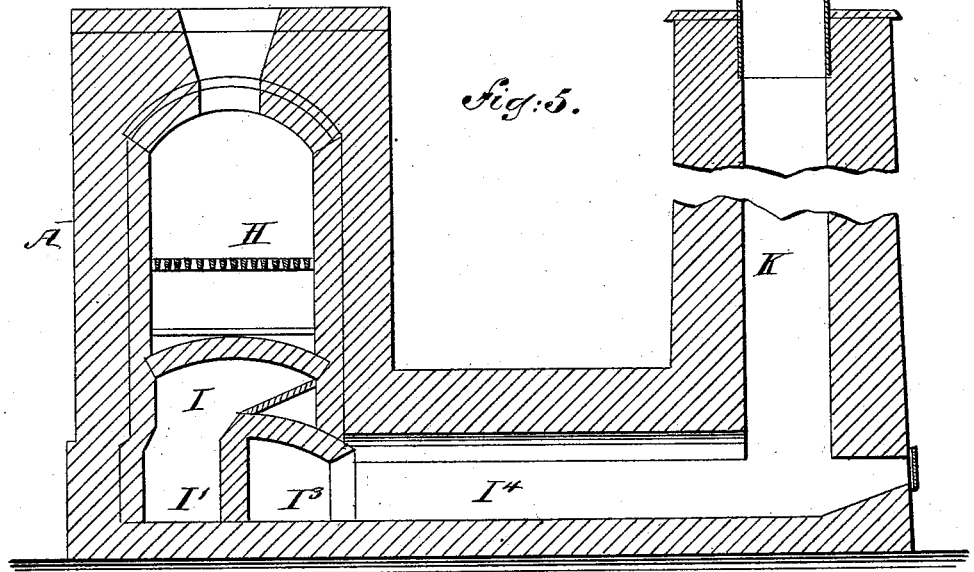
WITNESSES:
INVENTOR
A. Brownlee
BY
Munn & Co
ATTORNEYS.

(No Model.)  3 Sheets—Sheet 3.
A. BROWNLEE.
GARBAGE FURNACE.
No. 537,339. Patented Apr. 9, 1895.
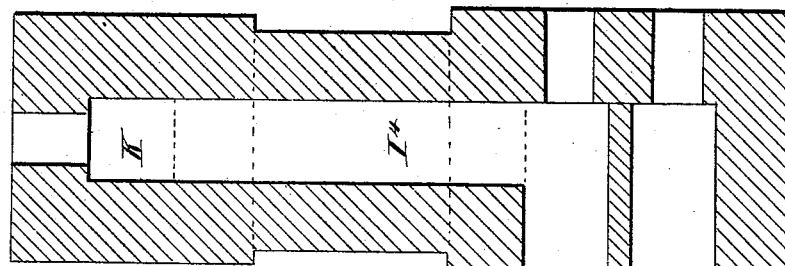
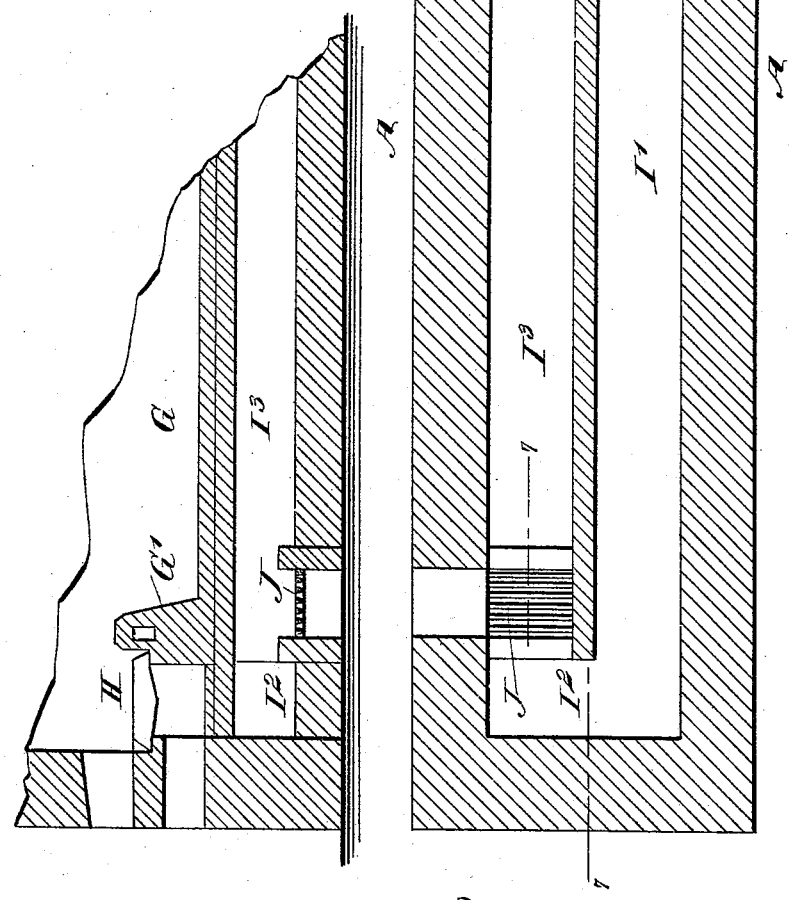
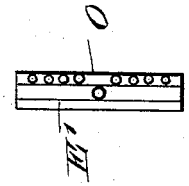
WITNESSES:
Chas. Nida.
C. Sedgwick
INVENTOR
A. Brownlee
BY Munn & Co
ATTORNEYS.

UNITED STATES PATENT OFFICE.

ALEXANDER BROWNLEE, OF DALLAS, TEXAS.

GARBAGE-FURNACE.

SPECIFICATION forming part of Letters Patent No. 537,339, dated April 9, 1895.

Application filed March 2, 1894. Serial No. 502,058. (No model.)

*To all whom it may concern:*

Be it known that I, ALEXANDER BROWN-LEE, of Dallas, in the county of Dallas and State of Texas, have invented a new and Improved Garbage-Furnace, of which the following is a full, clear, and exact description.

The invention relates to garbage furnaces such as shown and described in the Letters Patent of the United States, No. 448,115, granted to me March 10, 1891.

The object of the present invention is to provide a new and improved garbage furnace, which is comparatively simple and durable in construction, and very effective for burning all kinds of dry and wet garbage, kitchen refuse, animal matter, excrements, &c.

The improvement is embodied in the construction, arrangement, and combination of parts hereinafter described and specifically indicated in the claims.

Reference is to be had to the accompanying drawings, forming a part of this specification, in which similar letters of reference indicate corresponding parts in all the figures.

Figure 1 is a sectional plan view of the improvement on the line 1—1 of Fig. 2. Fig. 2 is a sectional side elevation of the same on the line 2—2 of Fig. 1. Fig. 3 is a transverse section of the same on the line 3—3 of Fig. 1. Fig. 4 is a similar view of the same on the line 4—4 of Fig. 1. Fig. 5 is a like view of the same on the line 5—5 of Fig. 1. Fig. 6 is a sectional plan view of the improvement on the line 6—6 of Fig 2. Fig. 7 is a sectional side elevation of the same on the line 7—7 of Fig. 6; and Fig. 8 is an enlarged sectional side elevation of the steam supply for the grate bearings.

The improved garbage furnace is arranged in a suitable casing A, built of brick or other proper material and provided with a chamber B, containing a grate C, made hollow for the circulation of water to prevent rapid destruction of the said grate. In the top of the casing A are arranged feed holes D, D', D², for introducing the material to be burned into the chamber B, the material resting on the grate C. The latter is supported at its sides in the wall of the casing A and at its middle on a longitudinally-extending support made in the form of a pipe E, and connected by downwardly-extending branch pipes E' with a horizontal pipe E² extending longitudinally in the bottom of the sand-box G, arranged below the grate C. The ends of the supporting pipe E are connected by pipes E³ with a boiler F, pump or other device for circulating water through the said supporting pipe E, the branch pipes E' and the longitudinal pipe E².

One end of the sand-box G forms a bridge wall G' for a fire-box H located below the adjacent end of the grate C, the latter slightly extending over the said fire-box, but not reaching to the end wall of the combustion chamber, thus leaving a downward passage for products of combustion as plainly indicated in Fig. 2. In the other end of the chamber B is arranged a second fire-box H' having its grate approximately in alignment with the grate C and resting at its inner end on a transverse wall G³ forming with the end wall G² for the sand-box G, a downwardly-extending chamber or passage I for the escape of the smoke and gases passing from under the grate C, as hereinafter more fully described. This passage I leads to a longitudinally-extending channel or flue I' arranged under the sand-box G, the left hand end of the channel I' connecting with a transverse channel I² leading to a longitudinal channel I³ arranged alongside the channel I' and likewise under the sand-box G, as will be readily understood by reference to Figs. 5, 6 and 7. In this channel I³, near the transverse channel I², is arranged a fire-box J in one side of the casing A, so that an auxiliary fire can be started in the said channel whenever it is desired to start up the furnace, as hereinafter more fully described. The right hand end of the channel I³ connects with a transverse channel I⁴ extending from the rear side of the casing A, to the bottom of a chimney K, set at one side of the casing. See Figs. 5 and 6.

In the sand-box G is arranged a perforated casing N forming a filter for carrying off any excess of water that may be in the garbage. This filter casing N (see Fig. 4) is connected at its bottom with an outlet pipe N' leading to one side of the furnace and connecting with a cesspool or other place of discharge, the said pipe being provided with a valve N², which, when open, serves to draw the liquid matter from the filter casing N to empty the same. In the sides of the sand-box G are the usual doors G⁴ which permit the operator to rake ashes from the top of the sand or filtering material and remove the ashes from the fire-box.

In the end walls G' and G² of the sand-box G are arranged the inclined steam discharge pipes O O' connected by pipes O² with a vertical pipe O³ connected with a suitable source of steam supply, so that steam can be discharged through the perforated pipes O' under the ends of the grate C to assist in burning the material placed on the said grate. In the sides and ends of the casing A are arranged suitable stoke holes A' for introducing suitable tools to agitate the material supported in the chamber B on the grate C. The fire-boxes H, H', and J, are provided with the usual fuel inlet doors and ash pits and doors, as indicated in the drawings.

The chamber B can be filled at any time with the material to be burned, and in order to start the furnace for burning the material introduced, it is first necessary to start a fire in the fire-box J, so as to heat the furnace, especially the channels I', I², I³, I⁴, and chimney K to insure proper circulation of the smoke and gases. After this is done, the fire in the box J may be discontinued and then the fire is started in the fire-boxes H and H' and kept going continually in the latter if sufficient material is on hand to keep the chamber B always charged.

It will be seen that products of combustion from fire grate H' follow a continuous serpentine course, passing over and through the garbage resting on the grate, C, then down through the passage (see Fig. 2) at the left-hand end of the latter, thence through the passage between the garbage grate and sand-box, G, next down through the passage, I, then along the flue, I', and back through the parallel flue I³, to the chimney. Thus the products of combustion, form a single point in the furnace, are conducted, by the most direct course practicable, over and through the garbage, then directly beneath it and over the contents of the sand-box, and, lastly, out and back beneath said sand-box, so that the heat is fully utilized. It will be seen that by this arrangement, all the smoke and gases arising from the material under treatment and the fuel in the several fire-boxes, is entirely consumed before reaching the chimney, and all the heat is utilized to assist in burning the material and to evaporate the liquid matter discharged from the material. When there is an excess of liquid matter in the filter casing N then the water can be withdrawn from time to time by the operator opening the valve N² in the outlet pipe N'.

It is understood that the sand-box G is filled with sand, gravel or other filtering material, to permit the liquid matter passing into the filtering material to drain finally into the filter casing N, as before described.

It is understood that a circulation of water through the grate rest and boiler is kept up, by introducing the cold water into the pipes from the bottom of the boiler and then back to the boiler from the top of the pipes as described. A similar arrangement is on the garbage grates, by taking the water in at a suitable distance below the inlet for the hot water so as to keep up the circulation.

Having thus fully described my invention, I claim as new and desire to secure by Letters Patent—

1. The improved garbage-furnace, having a fire-grate, and a garbage-grate arranged adjacently, and separated at the other end from the adjacent wall of the combustion chamber by a downward passage for products of combustion, the sand-box arranged beneath the garbage grate, a second downward passage at one end of said sand-box, and a two part or return flue beneath the latter, and communicating with the passage above it, substantially as described.

2. A garbage furnace, comprising a grate for the reception of the garbage, a sand box below the grate, a pipe extending along the bottom of the sand box and connected with a water supply, a pipe extending under the grate to support the same, and downwardly-extending branch pipes whereby the grate-supporting pipe communicates with the pipe in the sand box, substantially as described.

ALEXANDER BROWNLEE.

Witnesses:
E. J. GARRISON,
L. A. SMITH, Jr.